United States Patent [19]

Christensen

[11] Patent Number: 4,614,464
[45] Date of Patent: Sep. 30, 1986

[54] ADJUSTABLE JIG FOR HOLE FORMATION

[76] Inventor: Harry N. Christensen, 3019 Olive St., Racine, Wis. 53403

[21] Appl. No.: 754,150

[22] Filed: Jul. 12, 1985

[51] Int. Cl.⁴ .............................................. B23B 47/28
[52] U.S. Cl. ................................ 408/104; 408/115 R; 408/72 R
[58] Field of Search ................... 408/72 R, 72 B, 75, 408/97, 115 R, 115 B, 104, 105, 107; 33/182, 191

[56] References Cited

U.S. PATENT DOCUMENTS

| 550,767 | 12/1895 | Thielscher | 408/97 |
|---|---|---|---|
| 2,061,718 | 11/1936 | Stahl | 408/104 X |
| 2,475,263 | 7/1949 | Staggs | 408/104 |
| 3,138,975 | 6/1964 | Saye | |
| 3,685,916 | 8/1972 | Loomis | 408/72 |
| 4,461,603 | 7/1984 | Klee et al. | 408/115 R |

FOREIGN PATENT DOCUMENTS 248550  5/1947  Switzerland ...................... 408/115

Primary Examiner—Z. R. Bilinsky
Attorney, Agent, or Firm—Arthur J. Hansmann

[57] ABSTRACT

An adjustable jig for hole formation including a base on which a swingable arm is mounted and carries a bushing for guiding a cutting tool through the bushing and onto a workpiece clamped onto the base. The base clamp portion positions the workpiece in a position relative to the operative position for the cutting tool bushing, and there are adjustments for controlling the positioning of the bushing in the operative position and for controlling the positioning of the workpiece relative to the base. The entire arrangement is such that accurate holes or openings can be formed in the workpiece.

6 Claims, 5 Drawing Figures

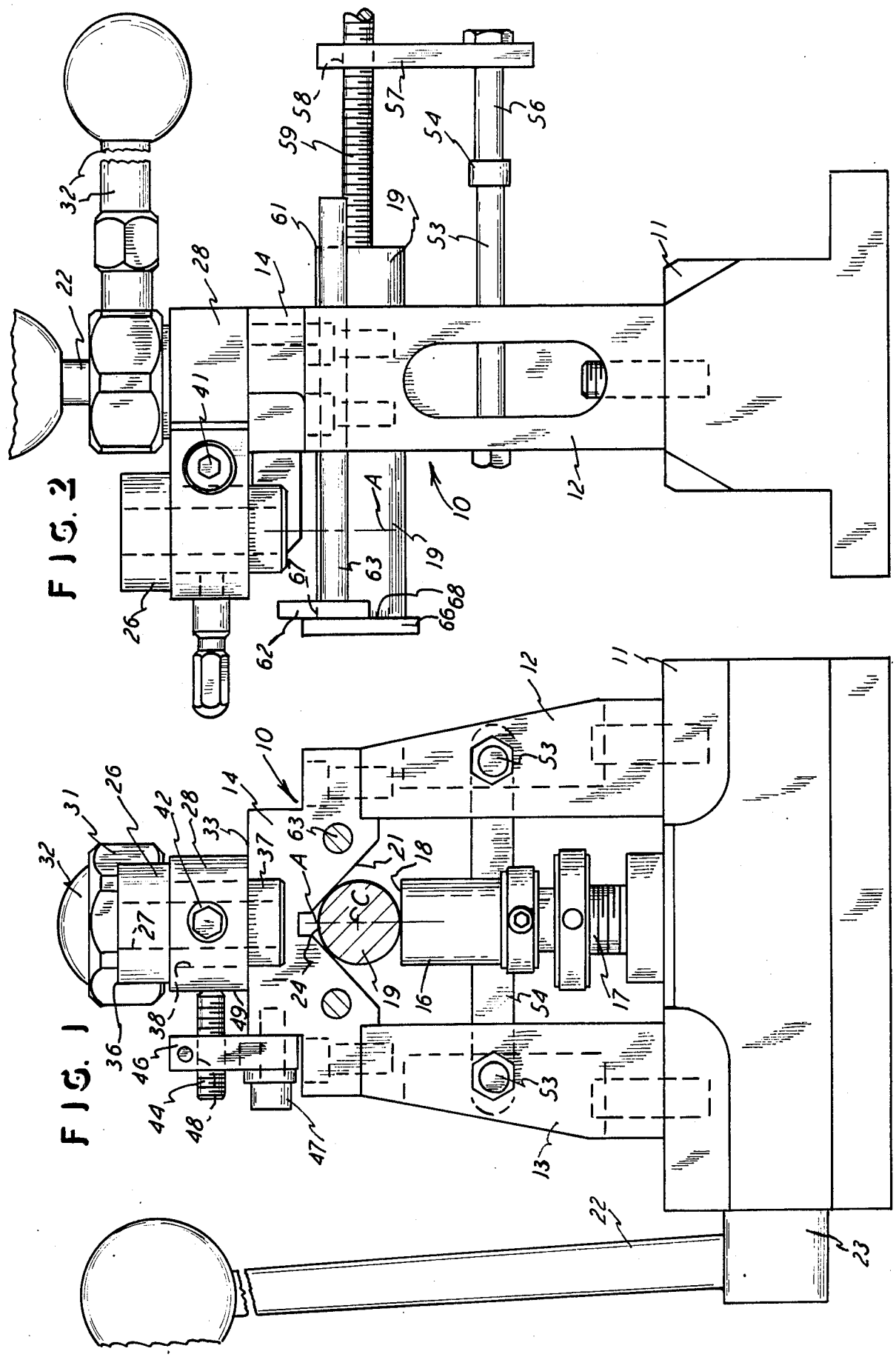

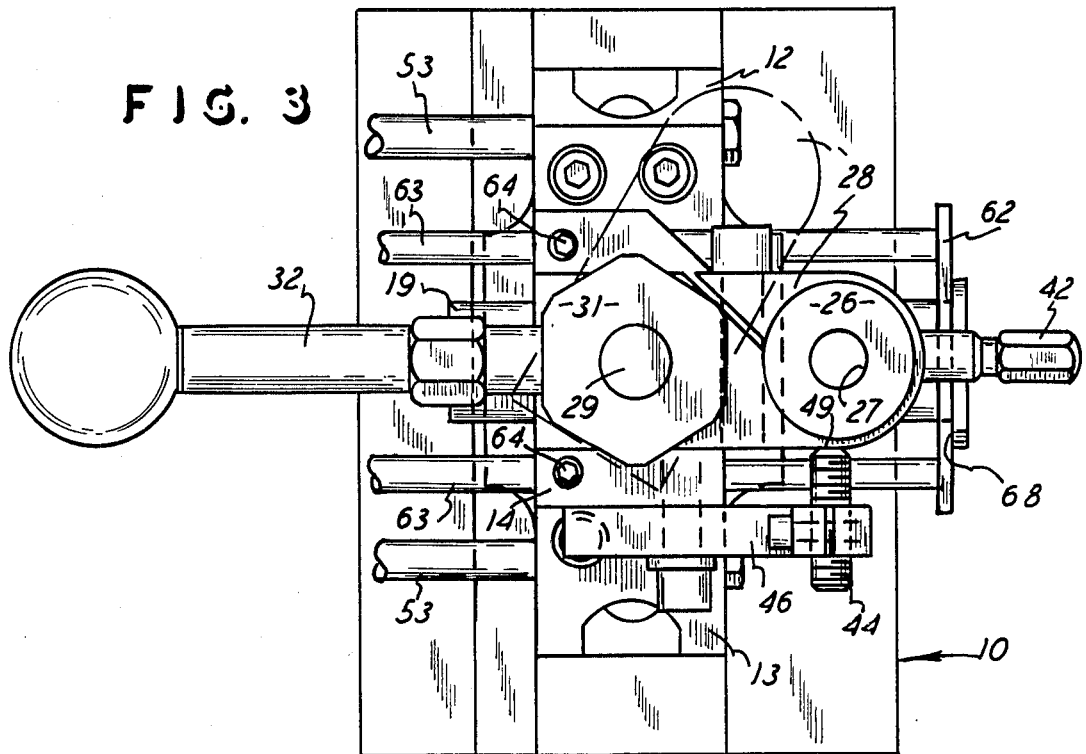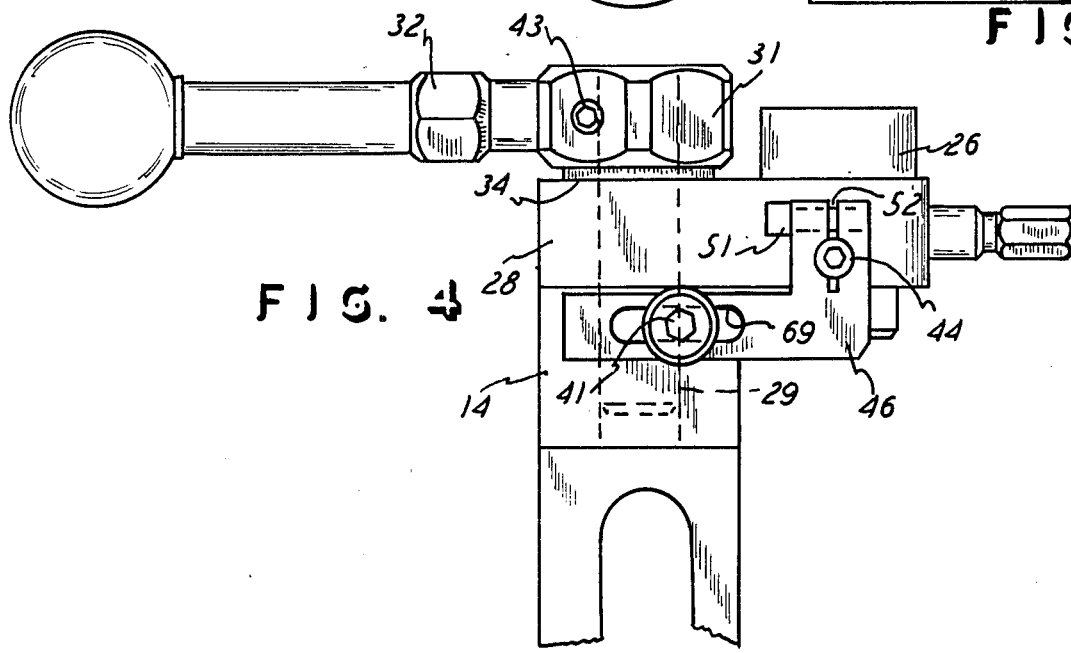

4,614,464

ADJUSTABLE JIG FOR HOLE FORMATION

This invention relates to an adjustable jig for hole formation, and, more particularly, it relates to a jig for guiding work tools, such as drills, reamers, tappers, and the like in exact locations on a workpiece.

BACKGROUND OF THE INVENTION

It is commonly know that in industry it is a concern, and a problem, to form a hole in an exact location in a workpiece. This is particularly a problem where the workpiece is cylindrical and one desires to drill on that workpiece curvature but yet have the hole formed in a dead-center position. Normally, the drill will inherently wander off the dead-center position, by virtue of the curvature of the cylindrical surface of the workpiece. It is common practice to provide a drill guide or bushing to assure that the hole will be formed on dead-center. However, the prior art does not provide for adjustment of the guide or bushing to position the hole either on dead-center or slightly off center or to position a drilled hole or the like in any other accurate position on a workpiece of any other configuration other than cylindrical.

Examples of prior art guides or jigs for drills or the like are shown in U.S. Pat. Nos. 3,138,975 and 3,685,916. These patents show drill bushings which are movable, relative to a workpiece, so that they can be positioned for guiding the drill onto the workpiece. However, they do not show any means for adjusting the bushing to have it be set in a specific adjusted position, relative to the workpiece, nor do they show a facile manner for moving the bushing out of the way when it is desired to ream, tap, or perform other operations on the drilled workpiece but to do so in the absence of the previously used bushing.

Accordingly, the present invention improves upon the prior art by providing a jig for hole formation in workpieces of various configurations, and to be able to accurately locate the hole in a precise position. This object is accomplished by virtue of having the jig include a drill guiding bushing which can be adjustably located, and its adjusted location can be re-established even though the bushing is moved off the workpiece for other operations, as mentioned.

Still further, the present invention provides for an adjustable jig which has a plurality of adjustments relative to the workpiece so that the drill or like cutting tool can be guided onto the workpiece which has been adjusted in any one or more of two or more ways, such as relative to the curvature of a cylindrical workpiece, relative to the location of a hole from the end of the workpiece, or relative to the location of a hole from a shoulder on the workpiece. All of these accurate locations are accomplished by virtue of a single jig with these several adjustment features. Further, the adjustments mentioned are readily and easily accomplished, so that repetitive drilling or the like can be carried on with the workpiece in a production type of operation and with therefore only a minimum of skill and time required. That is, the adjustment can be made at one time, and then the guide bushing can be swung into and out of position, by means of a lever or arm-type of control and locking mechanism which is readily but securely accomplished.

The aforementioned objectives are accomplished by means of a sturdy jig which is readily and easily set in the adjustment positions mentioned, and which securely holds the workpiece while it is being worked upon, and the jig is suitable for production type of accomplishment.

BRIEF DESCRIPTION OF THE DRAWINGS

FIG. 1 is a front elevational view of the jig of this invention and with parts thereof broken away.

FIG. 2 is a side-elevational view of FIG. 1, with the broken away parts included.

FIG. 3 is a top plan of FIG. 1.

FIG. 4 is a side elevational view of the upper portion of FIG. 1.

FIG. 5 is a top plan view of one part of the jig of FIG. 1.

DETAILED DESCRIPTION OF THE PREFERRED EMBODIMENT

The drawings show the jig or combined workpiece holder and tool guide of this invention, and it includes the base member, generally designated 10, and consisting of a platform 11 and two spaced-apart uprights 12 and 13 and a top cross-piece 14. These pieces are suitably secured together, such as by the screws and bolts shown, to form the base 10, which is therefore of a unitary rigid construction. A platen 16 is vertically movably mounted, such as through the screw 17, so that the platen has its workpiece supporting surface 18 movable up-and-down to clamp the workpiece 19 into the V-shaped opening 21 of the cross-bar 14, as shown in FIG. 1. A lever or arm 22 is connected through the shaft 23 to the screw 17, in any conventional arrangement, so that the platen 16 can be raised and lowered for clamping relationship with the cylindrical workpiece 19, as shown.

It will of course be understood that the base 10 can be clamped onto a machine tool bed, such as a drilling or milling machine, and thus the workpiece 19 is securely held for cutting procedures of the usual and well-known types, such as drilling, tapping, reaming, counter-boring, and the like.

In forming a drilled hole on dead-center line A, as indicated in FIG. 1 on the workpiece 19, it is important that a drill bit (not shown) be accurately positioned on the cylindrical surface 24 of the workpiece 19, and it is also important that the drill bit be restrained from wandering or wobbling, by virtue of the curvature of the cylindrical workpiece 19. To accomplish this, a drill bit guide or bushing 26 is positioned above the workpiece 19, and it has an opening 27 which snugly receives the drill bit to guide the drill bit accurately onto the workpiece 19 and exactly on the center axis A to thereby provide drilling the workpiece 19 with a hole on dead-center, as desired.

The bushing 26 itself is movable horizontally by swinging it from the operative position of FIG. 1 and to the inoperative position shown in dot-dash lines in FIG. 3. To accomplish this, a pivot or swing arm 28 is pivotally mounted on the base 10, such as by the pivot screw 29 extending through the arm 28 and into the cross-bar 14. A nut 31 is threaded onto the top of the screw 29, and a lever or arm 32 attaches to the nut 31 for rotating the nut 31 and the screw 29 to thereby clamp 28 relative to the base 10. In that manner, the arm 28 can be securely held against any pivoting or swinging movement about the bolt 29 when the arm 32 is positioned in the clamping position where the arm 28 is held firmly between the base upper surface 33 and the lower shoulder 34 of the nut 31, as shown in FIG. 4.

It will also be seen that the bushing 26 is of a T-shape having an enlarged head 36 and a cylindrical shank 37 which fits snugly into a cylindrical opening 38 in the arm 28. FIG. 5 further shows that the arm 28 has a split at 39, and a clamping screw 41 can extend therein in the opening 42 to clamp the bushing 26 in position. Still further, a clamping screw 42 can extend through the end of the arm 28 and abut the bushing shank 37 to further stabilize and hold the bushing 37, and that screw 48 can also be used for a quick release of the bushing 26, and there can be a plurality of bushings 26 with various sizes of central openings 27 to accommodate different sizes of formation or cutting tools, so that there is an entire set of bushings 26 for the desired purposes.

With the arrangement described thus far, the arm 28 is swingable between the operative position shown in solid lines, and the inoperative position shown in dot-dash lines in FIG. 3. For this purpose, the arm 32 is readily available for releasing the arm 28 relative to the base 10, by means of the rotation of the screw 29 which is fixed to the arm 32 through the set screw 43, for example. Thus, the bushing 26 is readily swung to a position above the workpiece 19 and the work tool can be guided through the elongated and central opening 27 in the bushing 26, as desired for accurate hole formation. Of course swinging the arm 32 in a clock-wise direction, as viewed in FIG. 3, will rotate the nut 31 and cause the screw 29 to move into the base 10 and thereby clamp the arm 28 in a fixed position, as desired.

An important feature is with respect to an adjustable stop 44 which is shown to be in the form of a threaded member extending through an upright support 46 suitably bolted to the base 10 by means of the screw 47. Of course the support 46 has a threaded opening 48 therethrough for receiving the threaded shank 44 so that the shank 44 can advance and retract relative to the side 49 of the swingable arm 28. In the operative position as shown in FIG. 1, the end of the screw 44 thus abuts the arm side 49 to position the arm 28 in the precise position desired in order to align the guide opening 27 with the workpiece axis A, all as desired. To assure that the threaded shank 44 remains in its adjusted position and is not upset or moved under vibration or the like, a clamping screw 51 extends across a split 52 in the support 46, as shown in FIG. 4, to thus clamp the screw 44 in its adjusted position for accuracy desired.

With that arrangement, the arm 28 can be swung to its operative and accurate position and clamped, by means of the lever 32. Conversely, release of the lever 32 will permit the arm 28 to be swung to the inoperative or dot-dash position of FIG. 3, and that will expose the workpiece 19 to other tools, such as a counter-boring, tapping, or reaming tool which need not now be guided by means of a bushing 26 since the first hole is already accurately positioned in the workpiece 19, as mentioned.

The holder or jig of this invention has two other adjustment features for accurately positioning the workpiece, and the one is shown in FIG. 2 where two rods 53 extend through the standards 12 and 13 and support a cross member 54 which in turn supports a central extension 56 and an upstanding member 57. The upper end of the member 57 has a threaded opening 58 which receives a threaded shank 59 and the shank 59 is positioned on the cener line of the workpiece 19, preferably. Thus, the end 61 of the workpiece 19 abuts the shank 59 and thereby determines the accurate dimension between the workpiece end 61 and the center axis A, as shown in FIG. 2, so that the hole to be formed in the workpiece 19 can be accurately located from the workpiece end 61. Of course the threaded shank 59 is adjustable along its length so that it can be positioned for appropriately positioning its end and thereby positioning the workpiece end 61 for the dimension desired.

A third adjustment is provided by means of a shoulder or end stop 62 which is supported on two rods 63 extending through the base 10. Thus the two rods 63 are spaced-apart, as shown in FIG. 3, and they slidably extend through the base 10 but are secured in selected positions by means of set screws 64. The stop or adjustment cross-piece 62 extends between the rod 63 and in the path of the piece 19, if the piece 19 has a shoulder, as designated 66. Of course it will be understood that the crosspiece 62 has a V-shape, such as shown with the vee 21 of FIG. 1, and it therefore has a vee at 67 to straddle the cylindrical piece 19 but to abut the shoulder wall 68. In that instance, again the piece 19 can have its hole accurately provided for the desired dimension from the shoulder surface 68 into the axis A. In that instance, it would be understood that it is critical that the hole in the piece 19 be accurate with respect to the dimension from the shoulder surface 68, rather than from the piece end 61.

FIG. 4 further shows that the holder 46 has a slot 69 extending therethrough, and the clamp screw 47 can then extend through the slot 69 and into the base 10. With that arrangement the holder 46 can be adjusted radially of the arm 28 to thereby position the adjustment screw 44 at the desired point of abutment for stopping the clock-wise rotation or swinging of the arm 28, for greater accuracy.

With this overall arrangement of a holder or jig, there are therefore actually four adjustments possible, namely, the adjustment with the screw 44, and the adjustment with the screw 59, and the adjustment with the rods 63, and the adjustment with the clamp screw 47. Further, the bushings 26 can be readily interchanged in their clamped and supported position in the swinging arm 28, and the arm 28 readily swings between the operative and inoperative positions, all for mass production of of accurate location of holes. The platen 16, along with the V-shape 21, forms a movable clamp for readily and accurately holding a workpiece, even a cylindrical piece 19, as shown. Of course the bushing 26 has a longitudinal axis extending through its opening 27 for alignment with the workpiece position by means of the V-shape 21. Of course the V-shape 21 has a central axis which is the axis A, and that axis is automatically aligned with the longitudinal axis of the bushing opening 27 when the adjustment 44 is properly positioned. It will also be understood that in the event the hole to be formed in workpiece 19 were to be off the axis A, then a different setting for the stop 44 and thus for the arm 28 would be accomplished, as desired. In this regard, the central axis of th V-shape 21 is actually coincidental with the longitudinal axis of the cylindrical workpiece 19, as indicated by the letter C in FIG. 1. Of course it is along this central axis C that the workpiece 19 is shifted for purposes of using the adjustable stops 59 and 62.

It will be further understood that the arm 28 has its cylindrical opening 38 for receiving the cylindrical shank 37 of the bushing 26, and thereby providing arrangements whereby an entire set of the bushings 26 can be used and individually inserted into the cylindrical opening 38.

What is claimed is:

1. An adjustable jig for hole formation, comprising a base, a movable clamp on said base for fixedly holding a workpiece, a mounting member on said base, an arm swingably mounted on said mounting member for swinging movement to an operative position in the vertical plane above said workpiece and being sufficiently narrow and swingable about said mounting member to achieve an inoperative position clear of said vertical plane, a forming tool bushing on the swinging end of said arm and having a hole extending therethrough and with the hole having a longitudinal axis alignable with said workpiece when on said vertical plane for having said bushing guide a forming tool onto said workpiece in the operative position of said arm, an adjustable stop on said base and in the swinging path of said arm for abutting said arm to limit swinging movement of said arm toward the operative position of said arm, and means for releasably holding said arm in the operative position.

2. The adjustable jig for hole formation as claimed in claim 1, including said base having a V-shaped opening for receiving the workpiece and with said V-shaped opening having a central axis, and an additional adjustable stop on said base and extending in the path of said central axis and being movable for moving along said central axis for abutting the workpiece to position the workpiece on said base along said central axis, and means for releasably holding said additional adjustable stop on said base.

3. The adjustable jig for hole formation as claimed in claim 1, including said base having a V-shaped opening for receiving the workpiece and with said V-shaped opening having a central axis, and an additional adjustable stop on said base and including a projection extending toward said central axis for moving parallel to said central axis for abutting a shoulder on the workpiece to position the workpiece on said base along said central axis, and means for releasably holding said additional adjustable stop on said base.

4. The adjustable jig for hole formation as claimed in claim 1, wherein said swinging end of said arm has a cylindrical opening extending therethrough and with the longitudinal axis of said cylindrical opening being co-axial with said longitudinal axis of said bushing, and a plurality of said bushings individually snugly fittable into said cylindrical opening and having their said holes of sizes different from each other to present a variety of forming tool guide holes, and releasable means for releasably holding said bushings on said bushings on said arm.

5. The adjustable jig for hole formation as claimed in claim 1, wherein said movable clamp includes a V-shaped opening for receiving the workpiece, and a lever connected with said clamp for actuating said clamp to open and close for reception and release of the workpiece.

6. The adjustable jig for hole formation as claimed in claim 1, wherein said means for holding said arm is a lever having a threaded end threadedly mated with said mounting member for releasably holding said arm in the operative position.

* * * * *